O. K. BROWN.
CULTIVATOR ATTACHMENT FOR TRACTORS.
APPLICATION FILED MAY 23, 1919.
1,378,994.
Patented May 24, 1921.
2 SHEETS—SHEET 2.
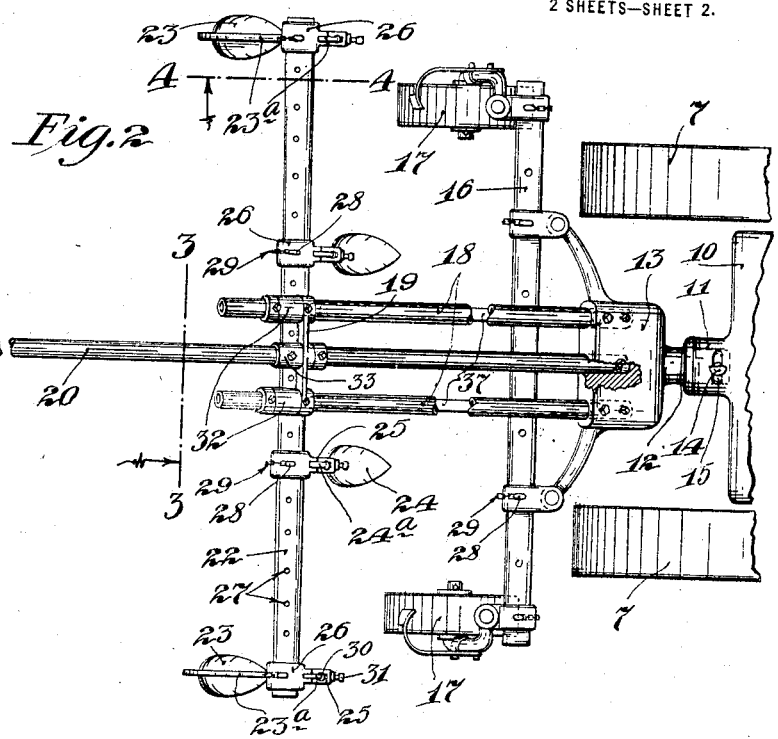
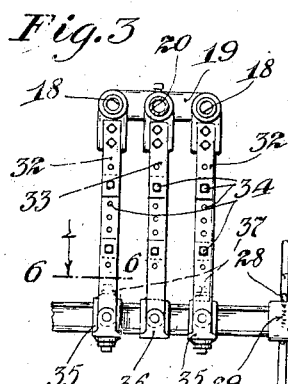
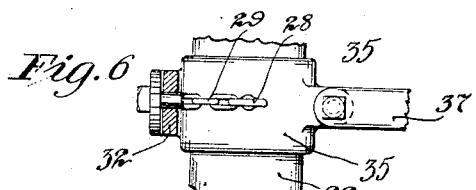
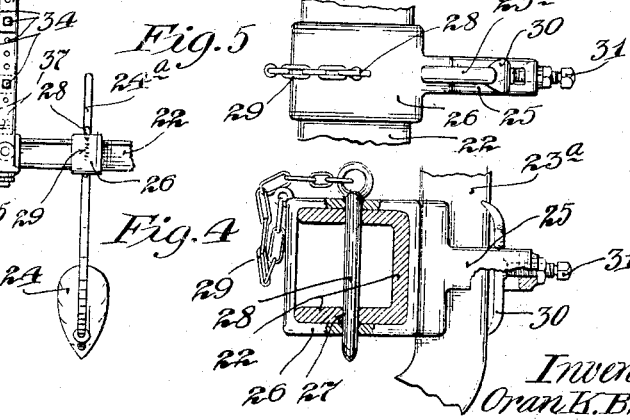
Inventor
Oran K. Brown
By his Attorneys
Williamson & Merchant

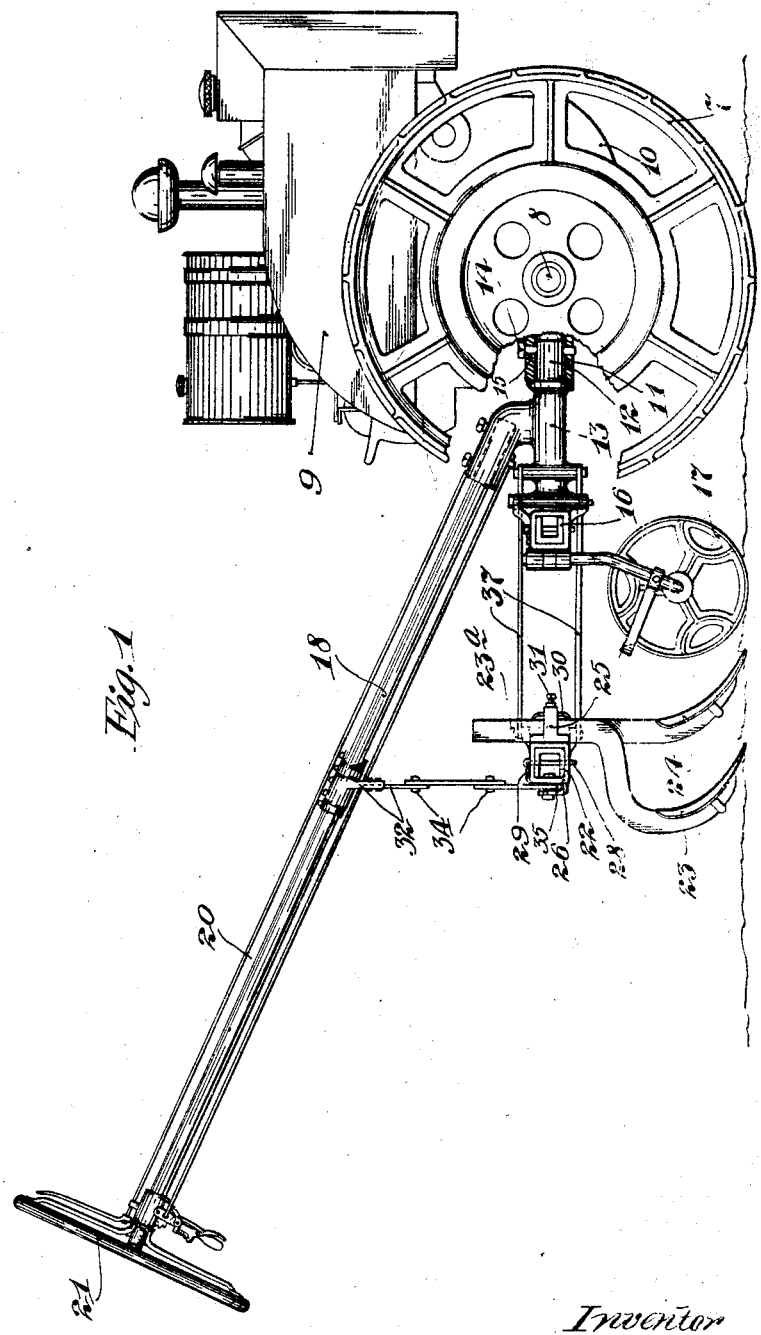

UNITED STATES PATENT OFFICE.

ORAN K. BROWN, OF EVANSTON, ILLINOIS.

CULTIVATOR ATTACHMENT FOR TRACTORS.

1,378,994.   Specification of Letters Patent.   Patented May 24, 1921.

Application filed May 23, 1919. Serial No. 299,363.

*To all whom it may concern:*

Be it known that I, ORAN K. BROWN, a citizen of the United States, residing at Evanston, in the county of Cook and State of Illinois, have invented certain new and useful Improvements in Cultivator Attachments for Tractors; and I do hereby declare the following to be a full, clear, and exact description of the invention, such as will enable others skilled in the art to which it appertains to make and use the same.

My invention relates to tractors of the small or so-called garden tractors and is directed to the improvement of means for adjusting the tools or ground working devices.

Generally stated, the invention consists of the novel devices and combinations of devices hereinafter described and defined in the claims.

Hitherto, in tractors of this type it has been considered necessary to provide several so-called handle bars for operating the tractors, to guide the same and for adjusting the tool beam laterally or transversely of the tractor. My invention provides an arrangement in which a single handle bar or post serves both functions above noted, to wit, by lateral movements it will guide the tractor and by rotary movements it will adjust the tool beams transversely of the tractor.

The invention is illustrated in the accompanying drawings wherein like characters indicate like parts throughout the several views. Referring to the drawings:—

Figure 1 is a view in side elevation illustrating my invention incorporated in a so-called garden tractor;

Fig. 2 is a plan view of the parts shown in Fig. 1;

Fig. 3 is a fragmentary section on the line 3—3 of Fig. 2 looking forward;

Fig. 4 is an enlarged section on the line 4—4 of Fig. 2, some parts being broken away;

Fig. 5 is a plan view of the parts shown in Fig. 4, some parts being broken away; and Fig. 6 is an enlarged detail in section on the line 6—6 of Fig. 3.

The parts of the tractor may be briefly noted as follows: Traction wheels are indicated by the numeral 6 and the main axle by the numeral 8. The engine, which is preferably an internal combustion engine indicated, as an entirety, by the numeral 9, is mounted above the axle and its base 10 is secured to bearings in which the axle is journaled. The engine base 10 is provided with a rearwardly extended sleeve 11 which affords a socket for a trunnion 12 of a so-called supplemental frame 13. A coupling pin 14 is extended through a perforation in the trunnion 12 and works in a transversely elongated slot 15 formed in the sleeve 11. This arrangement affords a swivel that permits the supplemental frame 13 to oscillate slightly in respect to the main frame and to the front axle of the tractor.

The caster wheel bar 16 is mounted in bearings on the ends or prongs of the supplemental frame 13 and is equipped with caster wheels 17. This caster wheel bar and the caster wheels are, or may be, of the usual or well known construction, preferably capable of transverse adjustments in respect to the main traction wheels.

To afford a support for the handle bar, transversely spaced oblique supporting bars or posts 18 are rigidly secured at their lower ends to the supplemental frame 13. The upper and rear end of these posts 18 are tied together by a transverse coupling bracket 19. This bracket 19 is adjustable on the posts 18, being preferably rigidly secured to said posts by set screws or other suitable devices.

The single handle bar is in the form of a heavy rod, preferably of tubular form. The lower end of this rod or handle bar 20 is journaled in the supplemental frame 13 and extends therefrom rearward and upward, and at its intermediate portion is journaled in the central portion of the coupling bracket 19. At its rear upper end, the handle bar 20 is provided with a rigidly secured hand wheel 21.

The tool beam 22 is preferably a rolled steel channel, and in any event should be a metallic beam of rectangular cross section. The cultivating tools, as shown in the drawings, are in the form of hoes 23—24 and are provided with shanks 23ª and 24ª, respectively. These shanks work adjustably through slots in projecting arms or lugs 25 of rectangular beam brackets 26. The brackets 26 are longitudinally adjustable on the tool beam 22. The tool beam 22 is provided with longitudinally spaced perforations 27 and the brackets 26 have perforations, through which perforations, lock pins 28 are adapted to be inserted. The lock pins 28 are provided with keeper chains 29 also secured to the brackets 26. The projecting arms 25 of the brackets 26 are provided with bearing plates 30 coöperating set screws 31 for vertical adjustments and rigidly holding the shanks 23ª—24ª in the desired position. The supporting bars 18 and the handle bar 20 have downwardly extended crank acting hanger arms 32 and 33, respectively, the lower ends of which are pivoted to brackets 35 and 36 that are rigidly but adjustably secured on the beam 22. Said arms 32 and 33 are thus mounted for parallel swinging motion. The arms 32 are loose on the bars 18 while the upper end of arm 33 is rigidly secured to the handle bar 20. In this way, the said hanger arms support the tool beam. To provide for setting the tool beam at different elevations, the hanger arms 32 and 33 are made vertically adjustable in length, and as shown, this is done by providing the sections of the said arms with perforations and coöperating clamping bolts 34 (see Fig. 3).

The tool beam 22 is arranged to be drawn forward by link-acting draw bars 37 pivoted at their front ends to the supplemental frame 13 and at their rear ends to the outside bracket 35. As shown, there are four of these draw bars 37 arranged in pairs, one over the other and with the members of the pairs on opposite sides of the transverse center of the machine, to wit, on opposite sides of the brackets 36 and link 33. The said link 33, when the handle bar 20 is oscillated, imparts the endwise transverse movements to the tool beam 22, but the links 32 coöperate therewith to hold the tool beam approximately parallel to the ground.

Operation.

By adjustments of the brackets 26 on the tool beam, the cultivating tools may be spaced laterally, as required to bring into proper action in the cultivating action. Of course, the said tools must be properly adjusted to correspond to the space between rows to be cultivated. In cultivating, it is frequently necessary to quickly shift the entire tool beam toward one side or the other to make the same properly follow the rows, or to prevent the same from cutting into the rows of growing vegetation. This may be quickly and easily done with the arrangement described, simply by oscillating the handle bar 20 by maniplation of wheel 21.

To run the tractor, the handle bar is simply forced toward one side or the other without rotating it. Thus, by manipulation of the single handle bar, the running of the entire machine may, as well as lateral shifting of the tool beam, be made an easy matter. The tool beam is, of course, drawn forward by the draw bars 37. These draw bars oscillate in parallel and with the parts to which they are connected form a parallelogram so that the tool beam will be always in position at right angle to the longitudinal axis of the tractor, throughout its endwise movements. Thus it will be seen that the tool beam is drawn forward and suspended by bars or link-acting members that act in parallel. The horizontal members serve to draw the said tool beam forward and the vertical members serve to hold the tool beam approximately parallel to the ground.

What I claim is:

1. In combination with a wheeled frame a single rearwardly projecting handle bar support, rigidly connected to the frame so that the same will be steered by lateral movements thereof, of a single handle bar mounted in said support for oscillatory movements therein, but movable laterally therewith to steer the frame, a single tool-equipped tool-supporting bar, approximately parallel links supporting said bar for movement transversely of said frame, and a connection between said handle bar and said tool-supporting bar for moving the same transversely of the frame.

2. In combination with a wheeled frame, a single rearwardly projecting handle bar support, rigidly connected to the tractor frame so that the tractor will be steered by lateral movements thereof, of a single handle bar mounted in said support for oscillatory movements therein, but movable laterally therewith to steer the tractor, a tool-equipped tool-supporting bar, approximately parallel links supporting said bar for movement transversely of a tractor, and a connection between said handle bar and said tool-supporting bar for moving the same transversely of the tractor, and approximately parallel and oscillatory links connecting said tool-supporting bar to the frame, for drawing the same forward.

3. The combination with a wheeled frame, a single rearwardly projecting handle bar support rigidly connected to the frame so that the same will be steered by lateral movements thereof, of a single handle bar mounted in said support for oscillatory movements therein but movable laterally therewith to steer the frame, a single tool equipped tool supporting bar, approximately parallel links supporting said bar from said handle bar support and extending downwardly at each side thereof, for movement transversely of said frame, and a connection between said handle bar and said tool supporting bar disposed centrally of said links for moving the same transversely of the frame.

In testimony whereof I affix my signature in presence of two witnesses.

ORAN K. BROWN.

Witnesses:
BERNICE G. BAUMANN,
FRANK D. MERCHANT.